US009892418B1

(12) United States Patent
Barua et al.

(10) Patent No.: US 9,892,418 B1
(45) Date of Patent: Feb. 13, 2018

(54) METHODS SYSTEMS AND COMPUTER PROGRAM PRODUCTS FOR ANALYZING UTILIZATION OF TAX PREPARATION APPLICATION WEBSITE

(71) Applicant: Intuit Inc., Mountain View, CA (US)

(72) Inventors: Ankur Barua, Cupertino, CA (US); Hoa Thi Le-Resnick, Union City, CA (US); Reid Daniel Burkhardt, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 959 days.

(21) Appl. No.: 14/089,351

(22) Filed: Nov. 25, 2013

(51) Int. Cl.
*G06Q 10/00* (2012.01)
*G06Q 30/00* (2012.01)
*G06Q 30/02* (2012.01)
*G06Q 40/00* (2012.01)
G06Q 20/20 (2012.01)

(52) U.S. Cl.
CPC ....... *G06Q 30/0204* (2013.01); *G06Q 40/123* (2013.12); *G06Q 20/207* (2013.01); *G06Q 30/02* (2013.01)

(58) Field of Classification Search
CPC .. G06Q 30/0204; G06Q 30/02; G06Q 20/207; G06Q 40/123
USPC ....................................................... 705/7, 33
See application file for complete search history.

(56) References Cited

U.S. PATENT DOCUMENTS

| 7,849,405 | B1* | 12/2010 | Coletta | G06F 9/4446 |
| | | | | 715/708 |
| 8,019,664 | B1* | 9/2011 | Tifford | G06Q 10/10 |
| | | | | 705/30 |
| 8,234,370 | B2 | 7/2012 | Hammer et al. | |
| 8,429,243 | B1* | 4/2013 | Wang | G06Q 30/0246 |
| | | | | 709/217 |
| 2007/0250418 | A1* | 10/2007 | Banks | G06Q 40/02 |
| | | | | 705/31 |
| 2008/0059900 | A1* | 3/2008 | Murray | G06F 3/0482 |
| | | | | 715/777 |

(Continued)

OTHER PUBLICATIONS

Adobe Systems Incorporated; Patent Issued for ASP for Web Analytics Including a Real-Time Segmentation Workbench. Internet Weekly News [Atlanta] Jan. 7, 2013: 21. 4 pgs.*

(Continued)

*Primary Examiner* — Timothy Padot
(74) *Attorney, Agent, or Firm* — Vista IP Law Group LLP; Gary D. Lueck

(57) ABSTRACT

Methods, systems and computer program products for segmenting users of a website of an online tax preparation application after segmentation or filter criteria has already been programmed by use of selected dynamic, user-defined or supplemental attributes and associated data provided to a segmentation module independently of previously programmed segmentation attributes and data thereof. Programmed attribute data and supplemental attribute data in different formats may be processed and merged or aggregated together such that subsequent queries can specify at least one external or supplemental attribute that was not previously programmed within a segmentation module, while also considering data of one or more of the programmed attributes.

19 Claims, 21 Drawing Sheets

(56) References Cited

U.S. PATENT DOCUMENTS

| | | | |
|---|---|---|---|
| 2008/0183805 A1* | 7/2008 | Cancel | G06Q 30/02 709/203 |
| 2008/0222284 A1* | 9/2008 | Barua | G06F 17/3089 709/224 |
| 2009/0157749 A1* | 6/2009 | Lessing | G06Q 30/02 |
| 2009/0171813 A1* | 7/2009 | Byrne | G06F 17/30867 705/26.1 |
| 2009/0234711 A1* | 9/2009 | Ramer | G06F 17/30749 705/14.66 |
| 2011/0288946 A1* | 11/2011 | Baiya | G06F 21/10 705/26.1 |

OTHER PUBLICATIONS

Business Intelligence and CRM Industry Leaders Support the Latest Release of Sane Solutions' NetTracker(R) Web Analytics Software. Business/Technology Editors. Business Wire [New York] Oct. 1, 2001: 1. 5 pgs.* https://support.google.com/analytics/answer/1686005?hl=en, printed Nov. 25, 2013 (3 pages).

http://en.wikipedia.org/wiki/Clickstream, printed Nov. 25, 2013 (3 pages).

http://strata.oreilly.com/2011/01/what-is-hadoop.html, printed Nov. 25, 2013 (4 pages).

http://en.wikipedia.org/wiki/Web_analytics, printed Nov. 25, 2013 (11 pages).

http://www.imediaconnection.com/content/18079.asp, printed Nov. 25, 2013 (5 pages).

http://en.wikipedia.org/wiki/Star_schema, printed Nov. 25, 2013 (4 pages).

http://en.wikipedia.org/wiki/Fact_table, printed Nov. 25, 2013 (3 pages).

http://en.wikipedia.org/wiki/Dimension_table, printed Nov. 25, 2013 (2 pages).

http://blog.crazyegg.com/2013/06/14/conversion-funnel-explored/, printed Nov. 25, 2013 (8 pages).

www.turbotax.com, printed Nov. 25, 2013 (3 pages).

* cited by examiner

| 401a<br>Programmed<br>Attribute 1 | 401b<br>Programmed<br>Attribute 2 | 284<br>Segmentation<br>Data (# Users) |
|---|---|---|
| New | Taxable | 5000 |
| New | Non Taxable | 800 |
| First | Taxable | 7000 |
| First | Nontaxable | 400 |
| Existing | Taxable | 10000 |
| Existing | Non-Taxable | 2000 |

FIG. 4C

|  | Supplemental Attribute 1 | Supplemental Attribute 2 | Supplemental Attribute 3 | Supplemental Attribute 4 |
|---|---|---|---|---|
| Website User 1 | T/F | T/F | T/F | T/F |
| Website User 2 | T/F | T/F | T/F | T/F |
| Website User 3 | T/F | T/F | T/F | T/F |
| Website User 4 | T/F | T/F | T/F | T/F |
| Website User 5 | T/F | T/F | T/F | T/F |
| Website User 6 | T/F | T/F | T/F | T/F |

701a-d (columns); 702a-f (rows); 710

MxN Matrix (M = # of website users; N = # dynamic, external, supplemental attributes)

FIG. 7A

|  | Called Help Desk | Only Reviewed | Purchased | E-Filed |
|---|---|---|---|---|
| Website User 1 | T | T | F | F |
| Website User 2 | T | T | T | F |
| Website User 3 | F | F | T | T |
| Website User 4 | F | F | T | F |
| Website User 5 | T | F | T | T |
| Website User 6 | F | F | T | F |

701a-d (columns); 702a-f (rows); 710

MxN Matrix (M = # of website users; N = # dynamic, external, supplemental attributes)

FIG. 7B

| | Meta-Time Grain | Meta-Attribute Name | Meta-Positional (Col) Index |
|---|---|---|---|
| Supplemental Attribute 1 | Time Grain 1 | Name 1 | Position / Column A |
| Supplemental Attribute 2 | Time Grain 2 | Name 2 | Position / Column B |
| Supplemental Attribute 3 | Time Grain 3 | Name 3 | Position / Column C |
| Supplemental Attribute 4 | Time Grain 4 | Name 4 | Position / Column D |

802a-d (rows); 801-c (columns); 800; 279

N x [Meta] Matrix ("Meta" = number of types of metadata provided by external source)

FIG. 8

| | Customer Status | Taxable State | Called Help Desk | Only Reviewed | Purchased | E-Filed |
|---|---|---|---|---|---|---|
| | 401a-b | | 701a-d | | | |
| TT End User 1 | New | Taxable | T | F | F | T |
| TT End User 2 | Existing | Nontaxable | T | T | T | T |
| TT End User 3 | First | Nontaxable | F | F | T | T |
| TT End User 4 | Existing | Taxable | F | F | T | F |
| TT End User 5 | Existing | Taxable | T | F | T | T |
| TT End User 6 | First | Taxable | F | F | T | F |

Join Operation

M x (N+P) Matrix (M - # TT end users; N = # Supplemental Attributes; P = # Programmed Attributes

FIG. 9B

| | COLUMN_NAME | NULLABLE | DATA_TYPE | DATA_DEFAULT | COLUMN_ID | COMMENTS |
|---|---|---|---|---|---|---|
| 1 | REPORT_DATE_ID | No | NUMBER(8,0) | (null) | 1 | (null) |
| 2 | STATUS_TYPE_ID | Yes | NUMBER(1,0) | NULL | 2 | (null) |
| 3 | FU_STATUS_ID | Yes | NUMBER(1,0) | NULL | 3 | (null) |
| 4 | FIRST_SKU_ID | Yes | NUMBER(3,0) | NULL | 4 | (null) |
| 5 | LAST_SKU_ID | Yes | NUMBER(3,0) | NULL | 5 | (null) |
| 6 | FIRST_CAMPAIGN_- | Yes | NUMBER(3,0) | NULL | 6 | (null) |
| 7 | NEAUTH_STATUS_ID | Yes | NUMBER(1,0) | NULL | 7 | (null) |
| 8 | RELEASE_NUMBER_- | Yes | NUMBER(3,0) | NULL | 8 | (null) |
| 9 | TAXABLE_STATE_ID | Yes | NUMBER(3,0) | NULL | 9 | (null) |
| 10 | CHPT_ID | Yes | NUMBER(6,0) | NULL | 10 | (null) |
| 11 | AUTH_ID_CNT | Yes | NUMBER(11,0) | NULL | 11 | (null) |
| 12 | D1_AUTH_ID_CNT | Yes | NUMBER(11,0) | NULL | 12 | (null) |
| 13 | D2_AUTH_ID_CNT | Yes | NUMBER(11,0) | NULL | 13 | (null) |
| 14 | D3_AUTH_ID_CNT | Yes | NUMBER(11,0) | NULL | 14 | (null) |
| 15 | D4_AUTH_ID_CNT | Yes | NUMBER(11,0) | NULL | 15 | (null) |
| 16 | D5_AUTH_ID_CNT | Yes | NUMBER(11,0) | NULL | 16 | (null) |
| 17 | D6_AUTH_ID_CNT | Yes | NUMBER(11,0) | NULL | 17 | (null) |
| 18 | D7_AUTH_ID_CNT | Yes | NUMBER(11,0) | NULL | 18 | (null) |
| 19 | D8_AUTH_ID_CNT | Yes | NUMBER(11,0) | NULL | 19 | (null) |
| 20 | D9_AUTH_ID_CNT | Yes | NUMBER(11,0) | NULL | 20 | (null) |
| 21 | D10_AUTH_ID_CNT | Yes | NUMBER(11,0) | NULL | 21 | (null) |
| 22 | D11_AUTH_ID_CNT | Yes | NUMBER(11,0) | NULL | 22 | (null) |
| 23 | D12_AUTH_ID_CNT | Yes | NUMBER(11,0) | NULL | 23 | (null) |
| 24 | D13_AUTH_ID_CNT | Yes | NUMBER(11,0) | NULL | 24 | (null) |
| 25 | D14_AUTH_ID_CNT | Yes | NUMBER(11,0) | NULL | 25 | (null) |
| 26 | D15_AUTH_ID_CNT | Yes | NUMBER(11,0) | NULL | 26 | (null) |
| 27 | D16_AUTH_ID_CNT | Yes | NUMBER(11,0) | NULL | 27 | (null) |
| 28 | D17_AUTH_ID_CNT | Yes | NUMBER(11,0) | NULL | 28 | (null) |
| 29 | D18_AUTH_ID_CNT | Yes | NUMBER(11,0) | NULL | 29 | (null) |
| 30 | D19_AUTH_ID_CNT | Yes | NUMBER(11,0) | NULL | 30 | (null) |
| 31 | D20_AUTH_ID_CNT | Yes | NUMBER(11,0) | NULL | 31 | (null) |

FIG. 11B

METHODS SYSTEMS AND COMPUTER PROGRAM PRODUCTS FOR ANALYZING UTILIZATION OF TAX PREPARATION APPLICATION WEBSITE

SUMMARY

Embodiments relate to utilizing a combination of static, pre-determined, internal or programmed internal segmentation attributes, and dynamic, user-defined or directed, external, or supplemental segmentation attributes, for analyzing data of a website for an online tax preparation application and providing customized, focused, on-the-fly analytics and segmentation capabilities.

Certain embodiments are directed to performing web analytics or segmentation of website users after segmentation or filter criteria has already been programmed by use of selected supplemental attributes and data thereof provided to a segmentation module independently of programmed segmentation attributes and data thereof.

Certain embodiments involve user segmentation involving data of static, pre-determined, programmed attributes and data of external, user-defined or supplemental attributes of different types or formats and processing data so that these different formats can be used in combination for segmentation. For example, embodiments may involve programmed attributes of whether a user is a new user or an existing user, in which case attribute data may be category data such as "new" user or "existing" user whereas external or supplemental attribute data may be "true" or "false" type data or, in other words, it is "true" that the user is an existing user rather than the descriptive "existing" data. These different data types are automatically merged or aggregated and processed such that subsequent queries can specify at least one external or supplemental attribute that was not previously programmed within a segmentation module, while also considering data of one or more of the programmed attributes.

Certain embodiments relate to programming a segmentation module or conversion funnel analyzer to provide initial segmentation capabilities using segmentation attributes programmed within the segmentation module at the beginning of a tax season or tax year, or when the online tax preparation application website for that season or year is launched, and also providing additional segmentation capabilities without having to reprogram other segmentation attributes within the segmentation module or conversion funnel analyzer or being limited by the programmed conversion funnel analyzer attributes.

Certain embodiments are directed to segmenting users of a website of an online tax preparation application and involve receiving navigation data, executing rules for programmed attributes and determining data of the programmed attributes. This data is merged, combined or aggregated with data of supplemental attributes received from an external source, i.e., the received attribute data does not involve a programmed attribute and is not determined by execution of a rule for a programmed attribute. Segmentation results generated by analyzing or processing different types of data. For example, embodiments may involve pre-determined, programmed attributes of whether a user is a new user or an existing user, in which case attribute data may be category data such as "new" or "existing" whereas external or supplemental attribute data may be "true" or "false" type data. These different data types are merged or aggregated such that they are associated or linked with each other and processed such that subsequent queries can specify a non-programmed, external or dynamic attribute while also considering data of one or more of the pre-determined, programmed attributes.

Certain embodiments are directed to joining or aggregating different types of data of respective static, or pre-determined and programmed attributes, and dynamic, or external or user-defined attributes, and determining respective segmentation data for combinations of static and dynamic attributes, processing or transforming resulting segmentation data into a relational database management system or other schema such that queries can be made for segmentation data across different attribute types. In certain embodiments, a conversion funnel analyzer is programmed with a certain fixed set of attributes, and data of at least on other attribute and metadata is received from an external source. A table is generated and populated with the received metadata, and another, fact table is generated and populated with resulting segmentation data. A query looks up in the metadata table one or both of a name of a dynamic attribute to be analyzed and points to a fact table and section thereof for corresponding segmentation data.

One embodiment is directed to a computer-implemented method for segmenting or selecting users of a website of an online tax preparation application, such as turbotax.com, which is operable to prepare an electronic tax return. The method is performed by a computer such as a computer hosting the online tax preparation application and comprises receiving or determining user navigation data, which is generated based at least in part upon or is indicative of respective interactions of respective users with the website. The method further comprises determining respective data of a pre-determined, programmed set of attributes, or static attributes, of respective users. Determining respective data of pre-determined, programmed attributes is based at least in part upon execution of respective rules that are associated with respective pre-determined, programmed attributes and that are applied to the navigation data. The data of respective pre-defined attributes is in a first format. The method further comprises receiving, from an external source, previously determined respective data of respective supplemental attributes, or dynamic attributes, of respective users, wherein previously determined respective data of respective supplemental attributes is in a second format different from the first format. The source is external in that, for example, the computer does not know how the supplemental attribute data was determined or the rules or logic for determining same. The method further comprises receiving a query comprising criteria specifying at least one pre-determined, programmed attribute and at least one supplemental attribute, and executing the query to generate a result, which comprises segmentation data. The segmentation data indicates a segment of the users (e.g., number of users and/or user identities if available) of the online tax preparation application website satisfying the criteria.

A further embodiment is directed to a computer-implemented method for segmenting or selecting users of a website of an online tax preparation application, such as turbotax.com, which is operable to prepare an electronic tax return. The method is performed by a computer such as a computer hosting the online tax preparation application and comprises receiving or determining navigation data for respective users, and determining respective data of respective pre-determined, programmed attributes of respective users based at least in part upon execution of respective rules associated with respective pre-determined, programmed attributes and that are applied to the navigation data. Data of pre-defined, programmed attributes is in a first format. The method further comprises receiving, from an external source, previously determined respective data of respective supplemental attributes of respective users, wherein previously determined respective data of respective supplemental attributes is in a second format different from the first format, and metadata of the supplemental attributes. The method further comprises generating a first data structure that joins respective data of respective pre-determined, programmed attributes in the first format and respective data of respective supplemental attributes in the second format and determining, based at least in part upon the first data structure, respective segmentation data comprising respective numbers of users of the online tax preparation application website satisfying respective pre-determined, programmed attributes and supplemental attributes and generating a second data structure comprising aggregated segmentation data. The method further comprises populating a fact table with aggregated segmentation data and populating a metadata table with received metadata and receiving a query comprising criteria specifying at least one pre-determined, programmed attribute and at least one supplemental attribute. The query is executed using both the metadata table and the fact table, and a result of executing the query comprises segmentation data indicating the number of users of the online tax preparation application website satisfying the criteria.

Further embodiments are directed to computer program products or articles of manufacture comprising a non-transitory computer readable medium and including one or more instructions which, when executed by the computer, are operable to execute method embodiments and performing a process for segmenting users of a website of an online tax preparation application operable to prepare an electronic tax return.

Yet other embodiments are directed to systems configured to segment users of a website of an online tax preparation application operable to prepare an electronic tax return. System embodiments may comprise or involve one or more of a computer hosting the online tax preparation application website such as turbotax.com, a conversion funnel analyzer, and one or more databases.

In a single or multiple embodiments, the result or resulting segmentation data, such as a number of users that satisfied the query criteria, is provided to a source of the query, which may be the same external source that provided the previously determined respective data in the second format.

In a single or multiple embodiments, the computer executes a conversion funnel analyzer, and embodiments are embodied within, e.g., a module of, the conversion funnel analyzer.

In a single or multiple embodiments, query criteria specifies one of the pre-defined, programmed attributes or a plurality thereof, and the at least one supplemental attribute.

In a single or multiple embodiments, the computer or segmentation module thereof programmed with or locally stores the pre-determined or static attributes does not have access to and does not know the rules or logic applied to determine respective data in the second format. Rather, for example, the data of the supplemental attribute is determined independently, e.g., by the external source, using external rules or logic, and then provided to the computer or segmentation module.

In a single or multiple embodiments data in the first format of the static, or pre-determined and programmed attribute, is in the form of natural language, e.g., a word representing a topic or category of an attribute concerning a tax return or the online tax preparation application. For example, a pre-determined, programmed attribute may be "user status" or "version of tax preparation application" and user navigation data (such as data entered by a user into a form or field generated by the online tax preparation application website and/or clickstream data generated in response to a user interacting with the online tax preparation application website) is analyzed by rules or business logic to determine whether the "user status" is "new user," "existing user" or "first time user" and whether the "version of tax preparation application" is (as an example involving turbotax.com), "Deluxe" or "Premier," whereas the previously determined data in the second format received from the external source is a binary or ternary format. For example, the received data may be in the form of a table or matrix that indicates "true" or "false" whether, for example, the user is "new user."

In a single or multiple embodiments, the pre-determined attributes are programmed, e.g., within a conversion funnel analyzer, for the online tax preparation application for a current tax year, and the external source provides the supplemental attribute data after the release, e.g., in the middle of tax season.

In a single or multiple embodiments, data of pre-determined, programmed attributes and previously determined supplemental attribute data of respective users are merged, combined or joined together, and the query is executed against the merged, combined or joined data. For example, the computer may generate a first data structure, such as a first matrix, that joins respective data of respective pre-determined, programmed attributes in the first format and respective data of respective supplemental attributes in the second format, and determine, using the first matrix, respective segmentation data for combinations of: a.) each data of a pre-determined, programmed attribute and, b.) each data of each supplemental attribute. A second data structure such as a second matrix is generated and includes aggregated segmentation data comprising respective segmentation data for each of the combinations, and the query is executed using the second matrix.

In a single or multiple embodiments, the aggregated segmentation data, e.g., in the second matrix, may be transformed or adapted for use in a schema operable for execution of the query and generating the result. Thus, if the schema is a relational database management system (RDBMS) schema, a fact table is generated and populated with aggregated segmentation data (e.g., from the second matrix), and each pre-determined, programmed attributes is a dimension table referenced by the fact table.

In a single or multiple embodiments, the external source also provides metadata of the supplemental attributes, and a metadata table of the schema is generated and populated with the supplemental attribute metadata. The query is executed utilizing both the metadata table and the fact table, e.g., by initially referring to the metadata table to identify a location within the fact table containing the corresponding segmentation data. For example, the metadata table may include data such as one or more of time grain data, fact table name data and dynamic attribute name data, and the query may indicate one or more of a selected name of a dynamic attribute to be analyzed and a selected date, which is used to identify which fact table should be accessed, and the location within the fact table containing the requested segmentation data, which is served as a result in response to the query. The result may be a number a number of users satisfying the criteria, e.g., 1,000 users are first time users and requested on-line assistance, wherein the user type (e.g., first time user or existing user) is a pre-determined, programmed or static attribute, and the attribute of whether a user requested on-line assistance is a supplemental or dynamic attribute that was provided by the external source.

In a single or multiple embodiments, an attribute that was a static or pre-determined, programmed attribute for one system, e.g., a conversion funnel analyzer for tax year 2011, may not be programmed in the conversion funnel analyzer for tax year 2012, but may be a dynamic or supplemental attribute for tax year 2012.

BRIEF DESCRIPTION OF THE DRAWINGS

The foregoing and other aspects of embodiments are described in further detail with reference to the accompanying drawings, wherein:

FIG. 4C illustrates segmentation data for different combinations of two static, programmed attributes;

FIGS. 7A-B illustrate examples of data structures including external, dynamic or supplemental attribute data for different website users and that is provided by an external source such as a product manager or analyst of the host of the tax preparation application website;

FIG. 8 illustrates an example of a data structure including metadata about external, dynamic or supplemental attributes and that is also provided by an external source such as a product manager or analyst of the host of the tax preparation application website;

FIGS. 9A-B illustrate how external, dynamic or supplemental attributes and data thereof are joined or integrated together with internal, static or programmed attributes and data thereof, wherein FIG. 9A is a system flow diagram showing same and FIG. 9B illustrates an example of a resulting data structure including both programmed and supplemental attribute data;

FIG. 11A generally illustrates how data shown in FIG. 10 and metadata shown in FIG. 8 are transformed into respective fact table and metadata table data structures defined by a schema for query execution, wherein FIG. 11B shows an example of how a fact table may be configured according to the schema and that is loaded with segmentation data.

DETAILED DESCRIPTION OF ILLUSTRATED EMBODIMENTS

Figure 1:
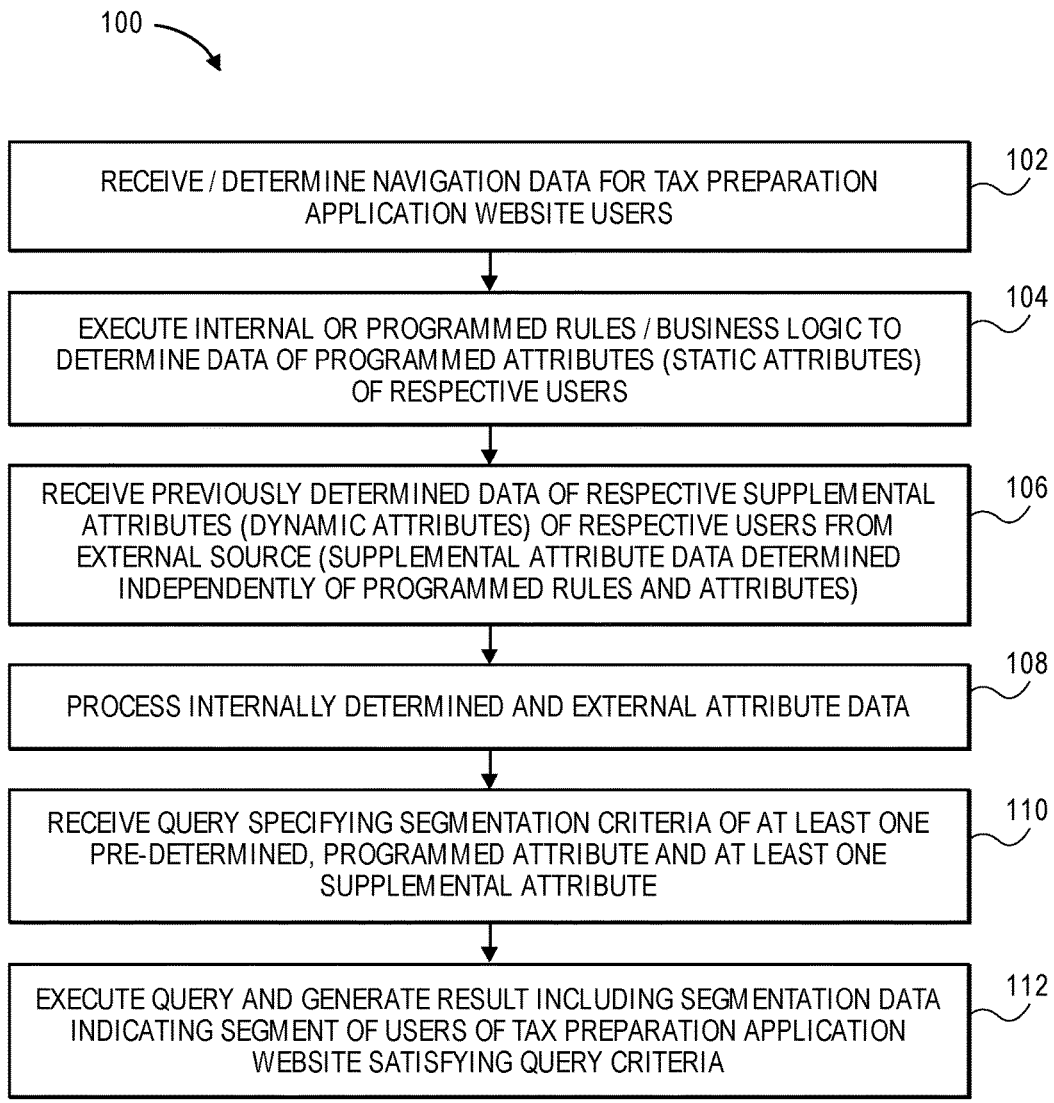
FIG. 1 illustrates a method for segmenting users of a website of a tax preparation application according to embodiments.

Embodiments are related to segmenting data of users of a website of an online tax preparation application in order to analyze which users interact with the online tax preparation application website and how they interact with the website. Segmenting website users is a form of web analytics and generally refers to classifying, categorizing or dividing users into groups so that analysts or hosts of the online tax preparation application website can better understand the context of data generated by users browsing the website. For example, embodiments are utilized to better understand metrics involving how website users interact with the website, actions taken or requested by website users, which types of website users interact with the website, which types of products are of interest, and how to modify the functioning of the website in order to drive users to different levels of use or to purchase the online tax preparation application. Embodiments may be implemented as a component of a conversion funnel analyzer, the "funnel" representing users progressing to different levels within the online tax preparation application website, and the narrowest or bottom portion of the funnel that may represent the smallest number of website users that reached a certain goal or stage such as ultimately purchasing the tax preparation application or used the tax preparation application to prepare and file a tax return.

With embodiments, segmentation can be performed using a pre-determined or static attributes already programmed within a segmentation module (generally, static, internal or programmed attributes), while providing for additional segmentation capabilities by allowing for introduction of data of other, dynamic or external supplemental segmentation attributes (generally, dynamic, supplemental or external attributes) utilized in combination with the programmed attributes. In this manner, embodiments provide for segmentation by use of a combination of attributes programmed within the segmentation module and other external attributes that are not programmed within the segmentation module, but that may be provided to the segmentation module by analysts on an as needed basis in order adapt or modify segmentation capabilities on the fly.

For example, a segmentation module may be programmed at the beginning of a tax year or tax season or when the online version of the tax preparation is initially launched, but during the middle of the tax year or season, analysts may want to perform other analyses besides segmentation provided by the programmed attributes. With embodiments, an analyst can identify which external or supplemental attributes are to be used for segmentation modification and provide data about those supplemental attributes such that the supplemental attribute data is integrated with programmed attribute data to modify segmentation capabilities, even when supplemental attribute data is in a different format compared to programmed attribute data. Thus, segmentation can be performed using only the originally programmed attributes or using a combination of an introduced supplemental attribute in combination with one or more programmed attributes, thus providing for more customized, focused, on-the-fly analytics and segmentation capabilities.

For example, referring to FIG. 1, in a method 100 according to one embodiment, at 102, a computer, which hosts or executes a segmentation module, which may be a component of or in communication with a conversion funnel analyzer (CFA), receives or determines navigation data generated as a result of website users browsing or interacting with the tax preparation application website. At 104, the computer provides navigation data as an input to programmed, known rules or business logic to determine data of one or more programmed attributes. At 106, the computer receives data from an external source in the form of previously determined respective data of respective supplemental attributes, otherwise referred to as dynamic attributes, of respective website users. Supplemental attribute data may be in a different format compared to programmed attribute data and is determined independently of the programmed rules and attributes. At 108, the computer processes data of the programmed attribute(s) and the external, supplemental attribute(s) in preparation for eventual queries. At 110, the computer receives a query specifying segmentation criteria of at least one programmed attribute and at least one supplemental attribute, and at 112, the query is executed to generate a result that includes segmentation data indicating segment (e.g., number) of website users of online tax preparation application website satisfying query criteria. Further aspects of embodiments are described with reference to FIGS. 2-15. Aspects of system components, their functionality and inter-operability are described, and further details regarding how these systems and components thereof can be utilized to implement method embodiments are described.

Figure 2:
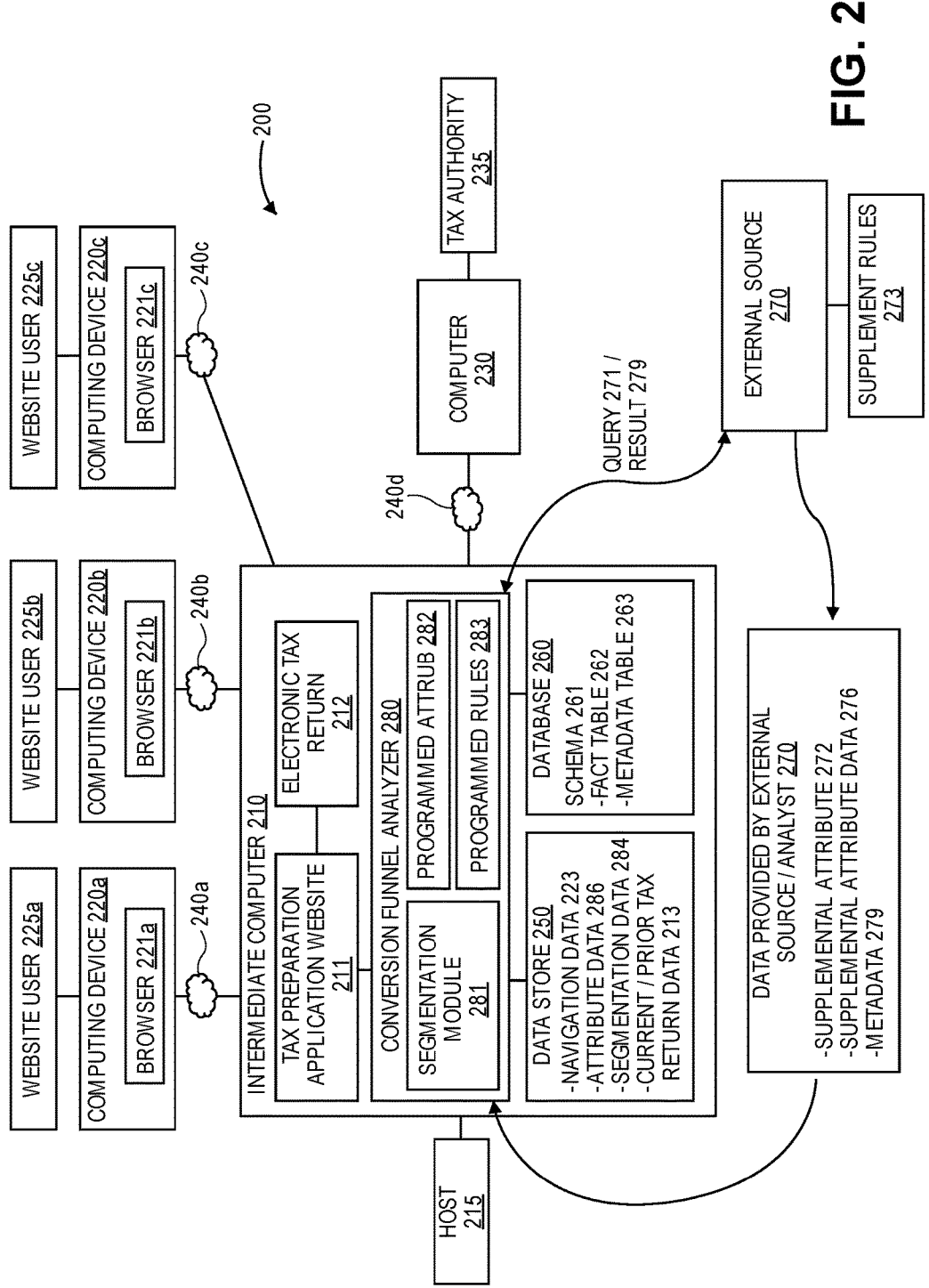
FIG. 2 is a block diagram of a system constructed according to embodiments for segmenting users of a website of a tax preparation application.

Referring to FIG. 2, a system 200 constructed according to one embodiment comprises or involves one or more intermediate computers 210 (one intermediate computer 210 is illustrated for ease of explanation) managed by a host 215, and which is in communication with computers or other computing devices 220*a-c* (generally, computing device 220) of entities such as website users, tax return filers, preparer or taxpayers 225*a-c* (generally, website user 225) (collectively, a "population" of website users or entities). Respective browsers 221*a-c* (generally, browser 221) execute on respective computing devices 220*a-c*.

The intermediate computer 210 hosts a website 211, or an online version of a tax preparation application (generally, "website" or "tax preparation application website"), which is operable to prepare and/or file an electronic tax return 212 with a tax authority 235. Tax preparation application is defined as a computer program product, or system, that is used solely for preparing a tax or information return or other tax filing, and that may be operable to record, transmit, transfer and organize data related to such tax filings, and that are directed to solely enabling taxpayers to file income tax returns or assisting them with managing their finances or tax-related matters. One example of an online tax preparation application website 211 is turbotax.com, of Intuit Inc., Mountain View, Calif.

The taxpayer or other user 225 of the tax preparation application website 211 may be a potential customer, taxpayer that has accessed the tax preparation application website 211 in order to research the tax preparation application, purchase the tax preparation application or utilize the tax preparation application to prepare an electronic tax return 212 or an accountant or tax professional that is preparing an electronic tax return 212 on behalf of the taxpayer or user 225 For ease of explanation, and not limitation, reference is made to website user 225.

The website user's computer 220 may be a desktop or laptop computer or other computing or communication device such as a tablet computing or communication device or other mobile communication device such as a smartphone (generally, computing device 210). The computing device 220 executes the browser 221 to access the tax preparation application website 211. The website user 225 navigates various pages of the website 211 in order to learn about the tax preparation application and may also launch the online tax preparation application to prepare or begin preparation of an electronic tax return 212, and certain users will continue to file the completed electronic tax return 212 with the tax authority 235 by e-filing the tax return 212 with a computer 230 of the tax authority 235 or printing and mailing the tax return 212 to the tax authority 235. During preparation of the electronic tax return 212, the website user 225 manually enters tax data or imports tax data from an electronic file or source into fields of interview screens or forms.

The intermediate computer 210 may also be in communication with one or more computers 230 of one or more tax authorities 235 (as illustrated in FIG. 2, which shows one tax authority 235 for ease of illustration). The intermediate computer 210 may serve as an electronic filing server or clearing house that formats and electronically files the completed electronic tax return 212 with the tax authority computer 230. The intermediate computer 210 processes acknowledgements and other data received from the tax authority 235 and routes related information back to the website user computer 220. One example of an intermediate computer 210 or electronic filing server that may be utilized for these purposes is an electronic filing server of Intuit Inc., Mountain View, Calif.

The tax authority 235 with which tax returns 212 are filed may be a federal tax authority such as the Internal Revenue Service (IRS), a state tax authority such as the State Franchise Board of California or other tax collecting entity to which taxes are paid. For ease of explanation, reference is made generally to a tax authority 235, and examples involve the IRS, but it will be understood that tax authority 235 refers to various tax collecting entities, including local, state and federal tax collecting entities, and embodiments may apply to generate estimates of when a taxpayer can expect to receive refunds from one or more or all of local, state and federal tax authorities.

Computers or computing devices shown in FIG. 2 are in communication with each other through respective networks 240*a-d*) (generally, network 240). Website users' computing devices 220*a-c* are in communication through respective network 240*a-c* with the intermediate computer 210, which may also be an electronic filing server operable to electronically file tax returns with the tax authority computer 230, and for this purpose, may be in communication through a network 240*d* with the tax authority computer 23. Networks 240 may be different, or two or more networks 240 may be the same depending on the system configuration and communication protocols employed. One or more or all of the networks 240 may be, for example, a cellular network, a wireless network, a Local Area Network (LAN) and/or a Wide Area Network (WAN) or a combination of two or more networks. Reference to a network 240 generally is not intended to refer to a specific network or communications protocol, and it should be understood that embodiments can be implemented using various networks and combinations thereof.

In the illustrated embodiment, the intermediate computer 210 is also in communication with, or hosts (as shown in FIG. 2), a data store 250 for storing various types of data, e.g., by use of a database table, file system directory or a HADOOP file system directory, and database or database system 260 such as a relational database management system (RDBMS) (generally RDBMS 260) which, as described in further detail below, is used for processing queries 272 by a requestor 270 or external source of the query 271. HADOOP is a registered trademark of The Apache Software Foundation, Forest Hill, Md. The requestor or external source 270 may be the host or employee of the host (e.g., an analyst or manager of the online tax preparation application), or another computer of the host. For ease of explanation, reference is made to an external source that is a person such as an analyst 270 being the requestor that submits the query 271, or the computing device utilized by the analyst 270, but it will be understood that embodiments are not so limited.

Further, as shown in FIG. 2, the intermediate computer 210 also hosts a segmentation module 281 which, as shown in the illustrated embodiment, is a module or component of a conversion funnel analyzer 280. The segmentation module 281 is programmed with pre-determined or known programmed attributes 282 and rules 283 that are executed to determine data 284 of these programmed 282 attributes. For ease of explanation, reference is made to programmed attributes 282 (otherwise referred to as "static" attributes) and programed rules 283 that are executed to determine data 286 of the programmed attributes 282. As described in further detail below, this is in contrast to data of other, supplemental attributes, which are not previously known or programmed as are the programmed or static attributes. Having generally described system components, how they function and how they are in communication with each other, further aspects of system components and how they operate to implement computer-implemented embodiments are described in further detail below with reference to FIGS. 3-15.

Figure 3:
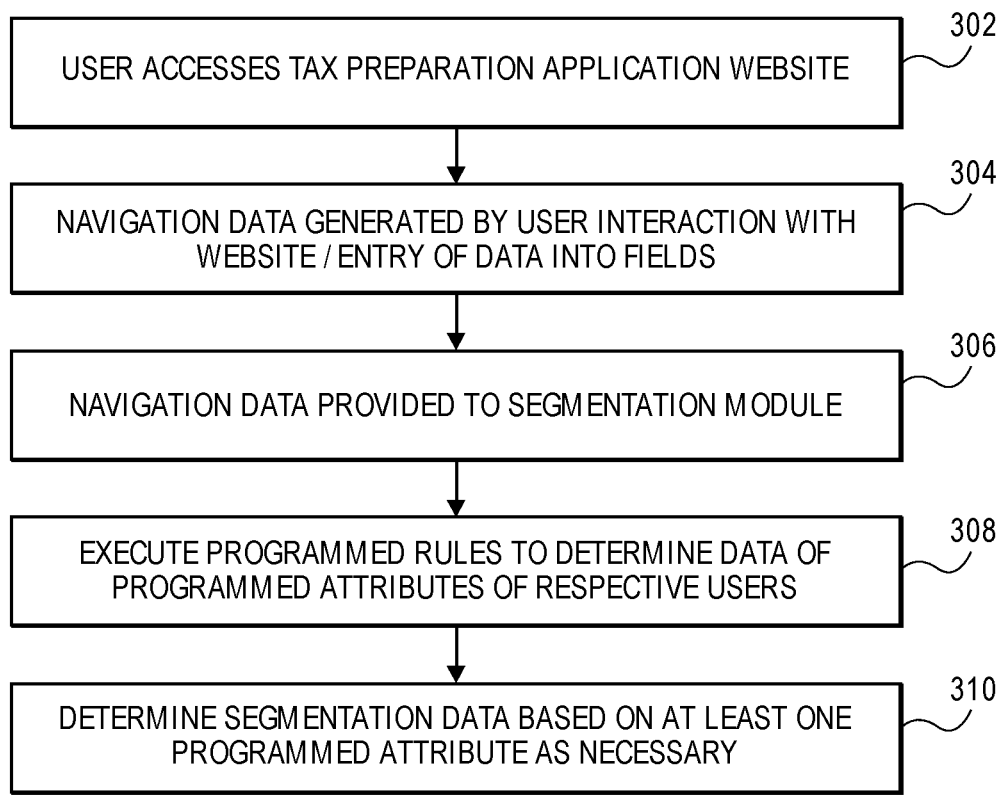
FIG. 3 illustrates a method for executing programmed rules for static, programmed attributes to determine programmed attribute data and programmed attribute based segmentation.

Referring to FIG. 3, at 302, website users 225 execute browsers 221 on user computing devices 220 to access the tax preparation application website 211, and at 304, as a result of online activities, navigation or interaction data 223 (generally, navigation data 223) is generated. Navigation data 223 may be generated as a result of the website user 225 browsing various pages, clicking links, advertisements or other aspects, or providing data within a field or form a page of the tax preparation application website 211.

For example, navigation data 223 is defined as including one or more of clickstream data that logs how the website user 225 navigates the tax preparation application website 211, or which pages or parts of a page or screen generated by the tax preparation application website 211 that the website user 225 clicks on while browsing. Navigation data 223 is also defined as including data entered by a website user 225 into a form or field generated by the tax preparation application 211, for example, for purchasing or paying to use the tax preparation application, for requesting help concerning the tax preparation application, or requesting additional information about the tax preparation application.

With continuing reference to FIGS. 2-3, at 306, the navigation data 223 is provided to segmentation module 281 and stored in the data store 250 as necessary. At 308, the segmentation module 281 executes pre-determined, programmed rules or business logic 283 (generally, programmed rules 283) for the pre-determined, programmed attributes 282, or static attributes, using the received navigation data 223. Execution of the programmed rules 284 generates data 286 of respective programmed attributes 286 for respective website users 225.

Figure 4A:
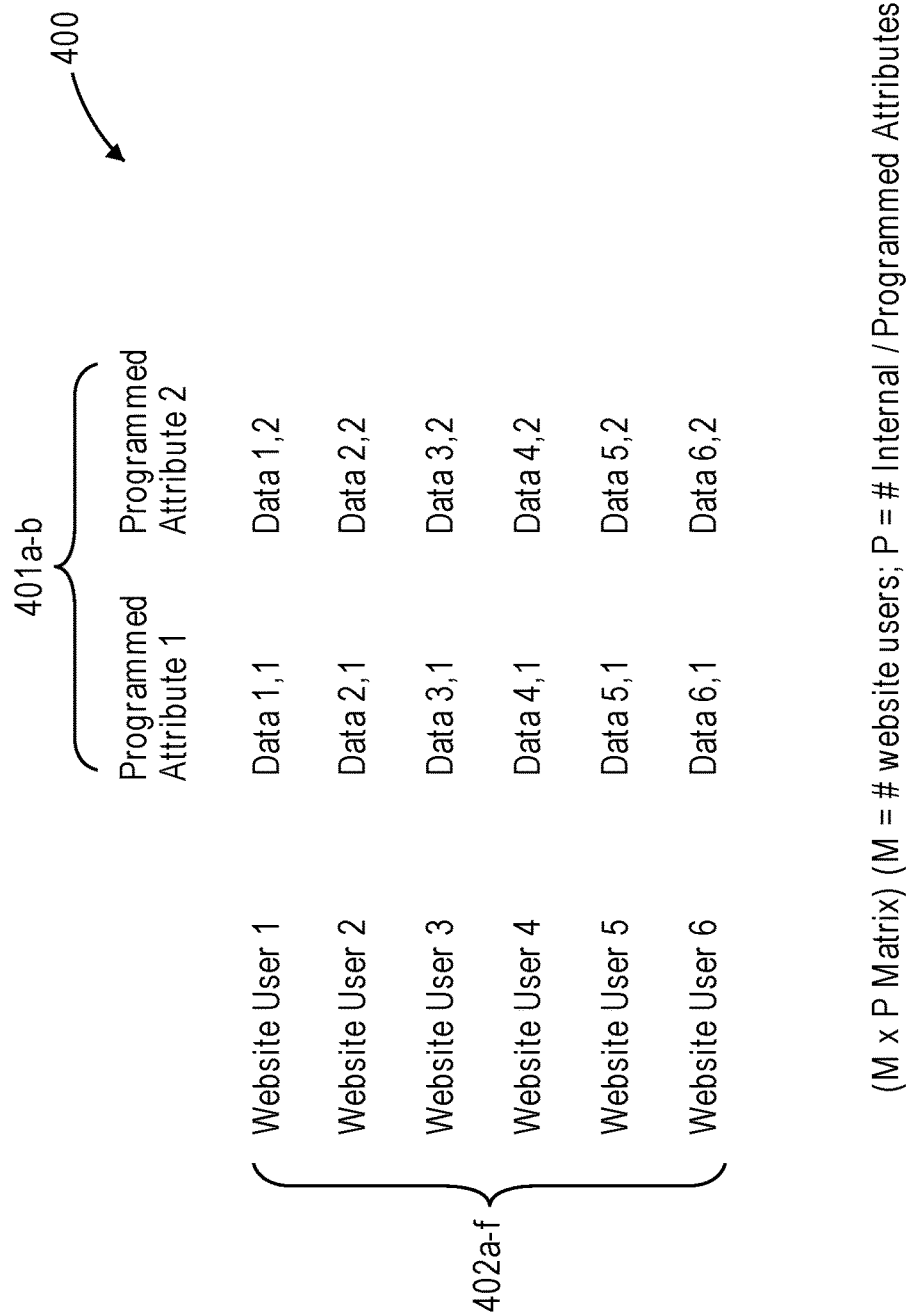
FIGS. 4A-B illustrate examples of data structures including programmed attribute data for different website users.

For example, referring to FIG. 4A, the segmentation module 281 may be programmed or configured with certain internal or programmed attributes 282, generally identified in FIG. 4A as "Programmed" or internal or programmed attributes 282, and which is a data structure 400 in the form of, for example a matrix with columns 401*a-b* for the programmed attributes 282*a-b* for respective website users 225, shown in rows 402*a-f* in FIG. 4A. While FIG. 4A illustrates only two columns 401*a-b* for programmed attributes 283*a-b* for ease of illustration, it will be understood that there may be two, five, ten, twenty, fifty and various other numbers of programmed attributes 283. Similarly, while FIG. 4A illustrates six website users 225 or end users of turbotax.com (TT), it will be understood that embodiments may involve hundreds, thousands and millions of website users 225.

In the illustrated embodiment shown in FIG. 4A, the programmed attributes 283 are organized according to a data structure 400, such as a matrix. Thus, in the illustrated example, the matrix or other data structure 400 is shown has being a M×P matrix, wherein M=number of website users 225 and P=number of existing, static or programmed attributes 283. Thus, first programmed attribute data for a first website user is identified as (Data 1,1), second programmed attribute data for the first website user is identified as (Data 1,2), and so on.

Figure 4B:
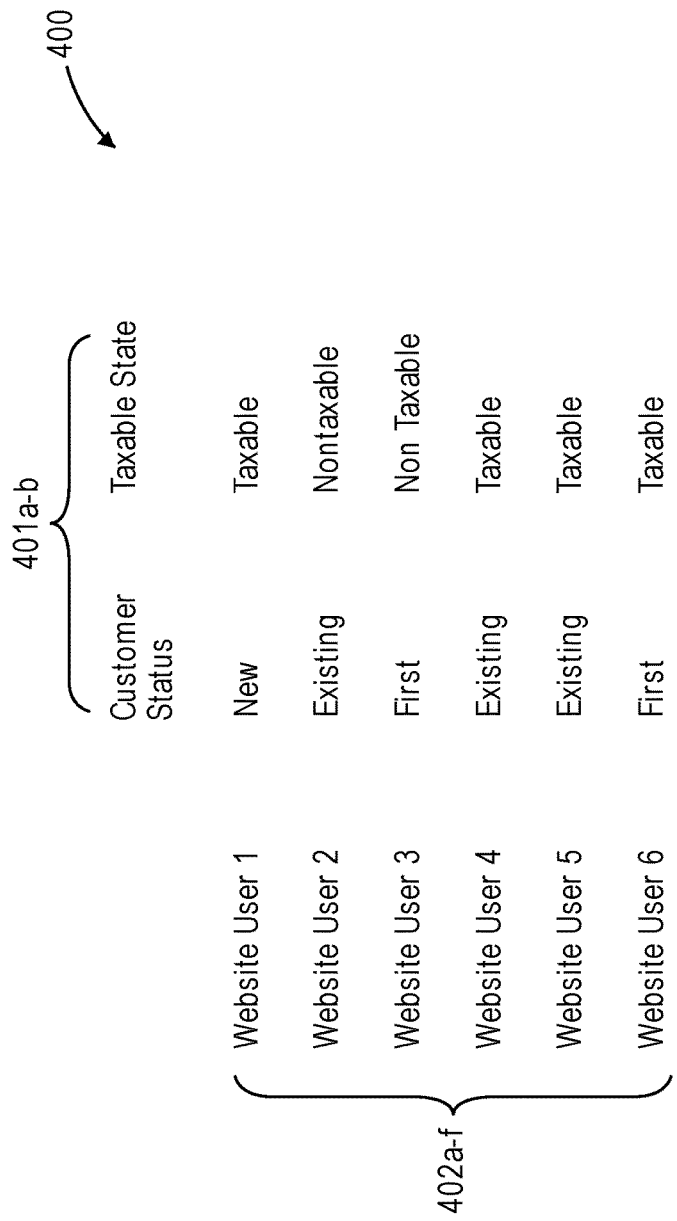

FIG. 4B illustrates an example of the matrix 400 shown in FIG. 4A and examples of programmed attributes 282 of the segmentation module 281. In the illustrated embodiment, the programmed attributes 282 are topics or categories associated with preparing an electronic tax return 212 or the tax preparation application website 211 and the attribute data 286 is in the form of topic or category options determined by application of the rules or business logic 283 executed by the segmentation module 281.

In the illustrated example, the programmed attributes 282 are "Taxable State" related to whether the website user 225 is from a state having a state income tax and "Customer Status" related to what type of website user 225 is browsing the tax preparation application website 211. For example, attribute options for "Taxable State" may include "Taxable" (such as for users from California) and "Nontaxable" (such as for users from Texas or other states that do not have state income taxes and do not have to complete state tax return forms). Attribute options for "Customer Status" may include: "New" user, "Existing" user and "First" time user or "First" use of the tax preparation application for a particular tax season. As an example, a programmed rule or business logic 283 executed by the segmentation module 281 may state that "Customer Status" is determined based on website user identification data within the navigation data 223, e.g., if the identification data in the form of an ID number is greater than a pre-determined number. If so, then that website user 225 is determined to be a "New" user. As another example, by knowing user identification number ranges for each tax season, a determination can be made regarding which tax season a user "first" used the tax preparation application. Thus, while "First" use may also correspond to a "New" user, additional criteria can be used to categorize new users as "first" time users based on their first use of a tax preparation application during a particular tax season. Other users associated with the same browser instance that the "first" user may be determined to be a "New" user. It will be understood that these examples are merely provided for purposes of explanation and illustration, and not limitation.

As shown in FIG. 4B, programmed attribute data 286 is in the form of natural language in that the programmed attribute data 286 identifies the option of the programmed attribute 282.

Referring again to FIG. 3 and with further reference to FIG. 4C, the segmentation module 281, as necessary, processes the programmed attribute data 286 to determine results or segmentation data 284 (generally, segmentation data 284) in the form of, for example, numbers of website users 225. Thus, in the illustrated example, the segmentation module 281 has determined that, for the various combinations of the options for the two exemplary programmed attributes 282 (resulting in nine possible combinations), 5,000 website users are new users and from a taxable state, 400 user are first time users from a nontaxable state, 10,000 users are existing users from a taxable state, and so on. The resulting segmentation data 284 based on the programmed rules and programmed attribute data are stored to the data store 250 as necessary.

Figure 5:
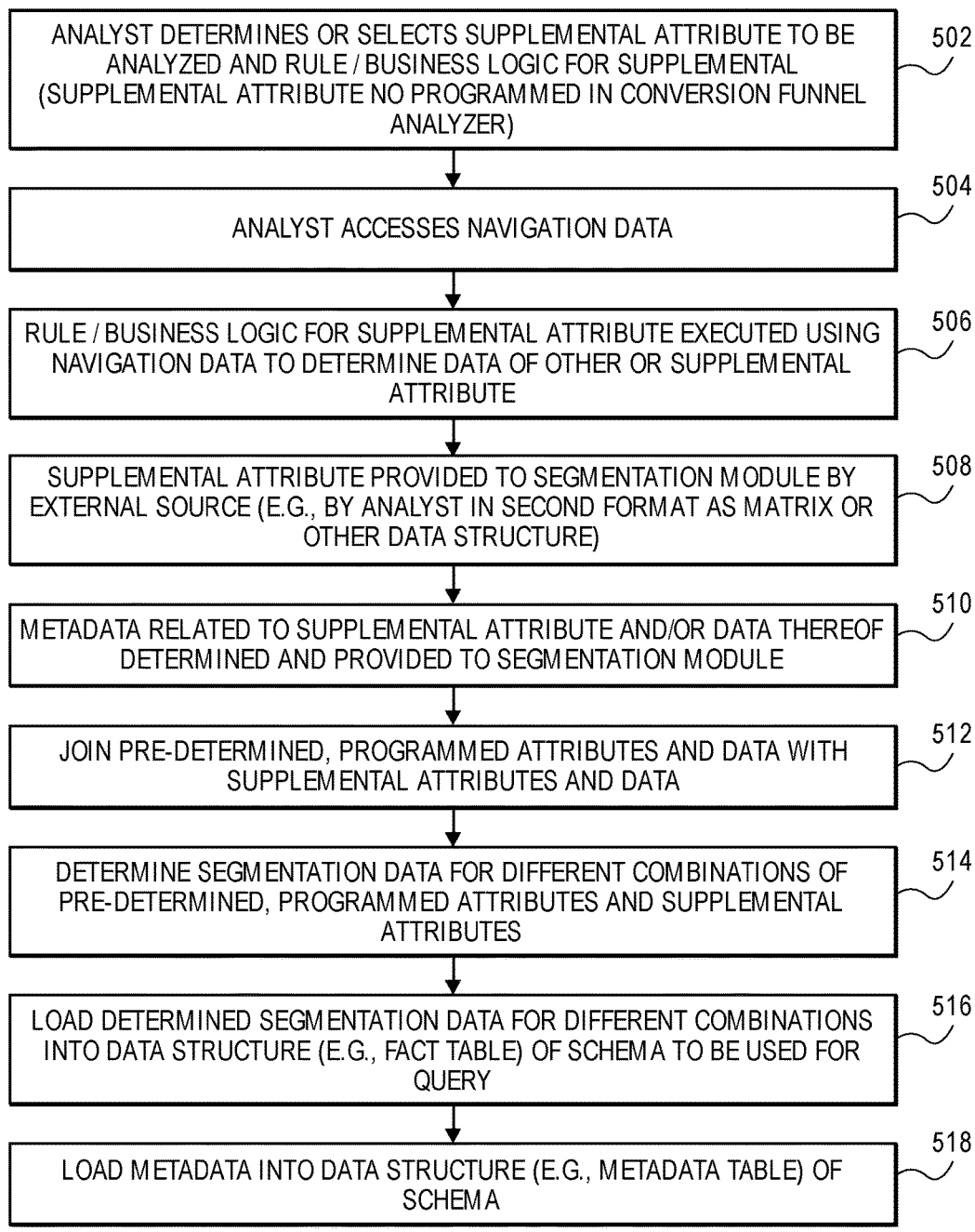
FIG. 5 illustrates a method according to one embodiment for integrating external, dynamic or supplemental attributes and data thereof into a segmentation mix with the static programmed attributes and preparing data structures for queries executed against a combination of programmed and supplemental attribute data.
Figure 6:
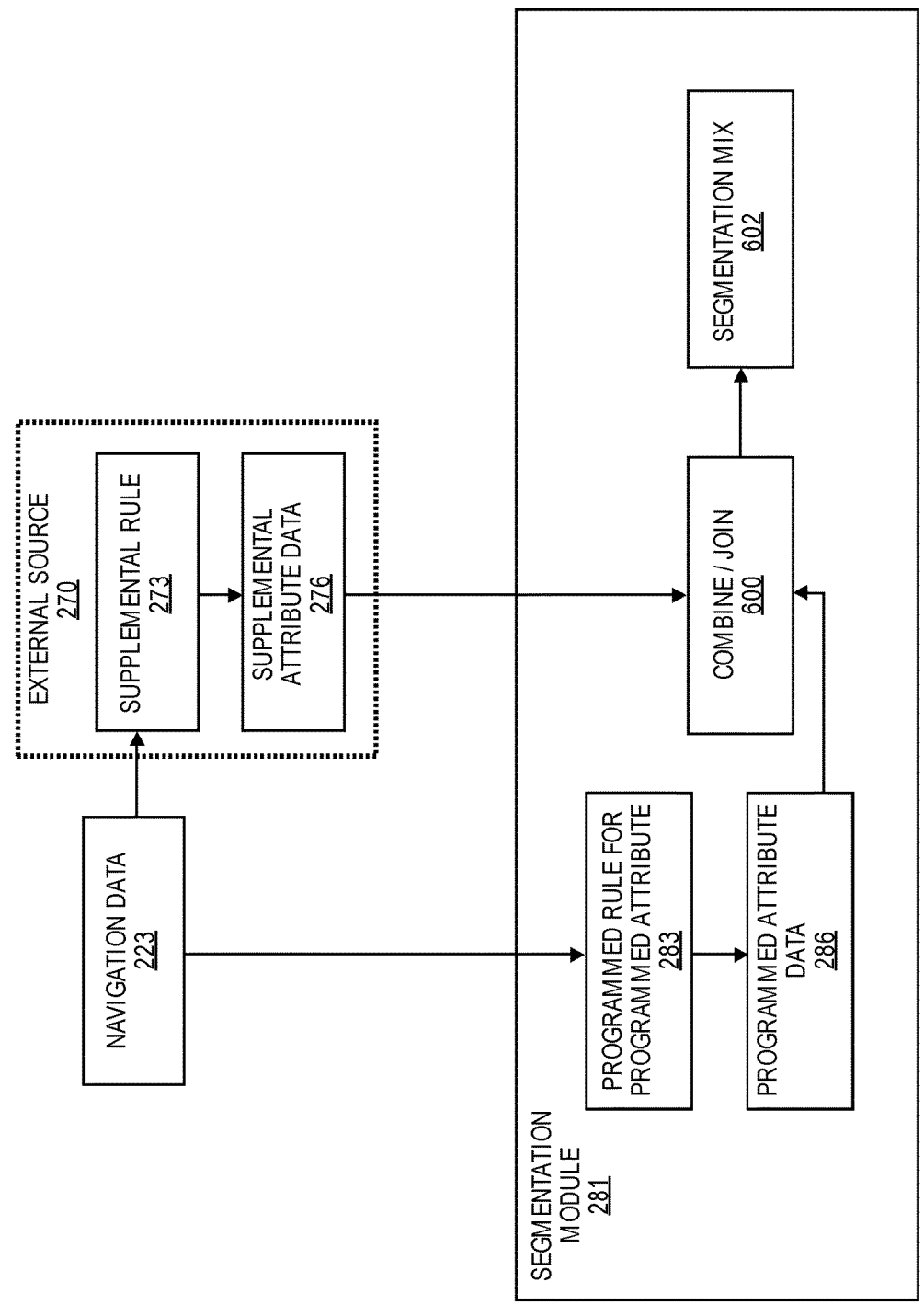
FIG. 6 is a system flow diagram further illustrating how external, dynamic or supplemental attributes and data thereof are integrated into a segmentation mix with static programmed attributes and preparing data structures for queries executed against a combination of programmed and supplemental attribute data.

Referring to FIGS. 5-6, according to embodiments, programmed attributes 282 and data 286 thereof are combined with supplemental attributes 272 and data 278 thereof provided by the external source 270, which, as noted above, may be the same host 215 or analyst, manager or employee of the host 215. For ease of explanation, reference is made to an analyst as being the external source 270. At 502, the analyst 270 determines, defines or selects at least one other or supplemental attribute 272 to be analyzed and the applicable rule or business logic 273 to be applied to navigation data 223 for the at least one other or supplemental attribute 272. At 504, the analyst (or computing device utilized thereby) accesses the navigation data 223 in the data store 250, and at 506, the identified or selected rule or business logic 273 for the determined or selected other or supplemental attribute 272 is executed on the navigation data 223 to determine data 276 of the other or supplemental attribute 272. This is generally illustrated in FIG. 6, which shows the navigation data 223 being provided as an input to the programmed rules 283 of the segmentation module 281 (as discussed above) and also provided as an input to one or more external rules 273 for external, supplemental attributes 272. Thus, according to embodiments, the analyst selected or defined supplemental attributes 272 and rules 273 therefor are not programmed within the segmentation module 281 or CFA 280. Instead, rules or business logic 273 for the supplemental attributes 272 are not known or executed by the segmentation module 281 or CFA 280. Thus, supplemental attribute data 276 is not determined by the segmentation module 281 or CFA 280. Further, rules or business logic 273 for determining supplemental attribute data 276 based on the navigation data 223 are not executed by the segmentation module 281 or CFA 280, and since they are selected or determined by the analyst 270 instead, the rules or business logic 273 may not even be known to the segmentation module 281 or CFA 280. Thus, what the segmentation module 281 or CFA 280 does know is that it has received supplemental attribute data 276 from an external source 270, but does not know how that supplemental attribute data 276 was determined or generated.

Continuing with FIG. 5, at 508, the supplemental attribute data 276 determined independently of the segmentation module 281 is provided by the analyst 270 or analyst's computing device, or from another external source, to the segmentation module 281. In other words, the analyst manually labels or assigns, or labels or assigns by execution of a separate program, data 276 to supplemental attribute 272.

According to one embodiment, and as illustrated in FIGS. 4A-B and 7A-B, supplemental attribute data 276 is in a different format compared to the format of programmed attribute data 286. For example, the supplemental attribute data 276 provided by the analyst 270 is organized in a data structure 700 such as a matrix such that the matrix includes binary or ternary data 710, such as T/F, Y/N or 1/0 data, which indicates whether or not a particular website user 225 satisfies or falls within a supplemental attribute 272 or a category or topic thereof, as opposed to specifying the category or topic itself.

FIGS. 7A-B show an example of a data structure or matrix including rows 702a-F for each of the website users 225 and columns 701a-d for different supplemental attributes 272, wherein the matrix has is a M×N matrix, wherein M=the number of website users 225 and N=number of supplemental attributes 272. In the illustrated embodiment, the format of supplemental attribute data 276 is in the form of T/F indicators 710 for supplemental attributes 272a-d whether the website user 215 called the help desk, only reviewed information about the tax preparation application 211, whether the website user 225 actually purchased or paid to use the tax preparation application 211, and whether the website user 225 proceeded to prepare an electronic tax return 212 and electronically file the electronic tax return 212 with a tax authority 235.

Referring again to FIG. 5, and with further reference to FIG. 8, at 510, the analyst 270 or analyst computing device generates or receives another data structure or matrix 800 including metadata 279 related to the supplemental attribute 272 or supplemental attribute data 276 and provides the metadata matrix 800 to the segmentation module 281. For example, as shown in FIG. 8 in which three types of metadata 279a-c are used, the metadata matrix 800 may be structured as a N×3 matrix, where N=number of supplemental attributes 272 (e.g., four rows 802a-d for the exemplary four supplemental attributes) for which metadata 279 is provided in respective columns 801a-c. In the illustrated embodiment, the metadata matrix 800 includes metadata 279 about the external, analyst defined, supplemental attributes 272 such as time grain data, the name of the supplemental attribute 272 and position or location data, such as a positional or column index data of the data structure or matrix 700 shown in FIGS. 7A-B. As described in further detail below, according to one embodiment, this metadata 279 is used to reference a fact table from which segmentation results 284 are retrieved in response to an analyst query 271.

Figure 9A:
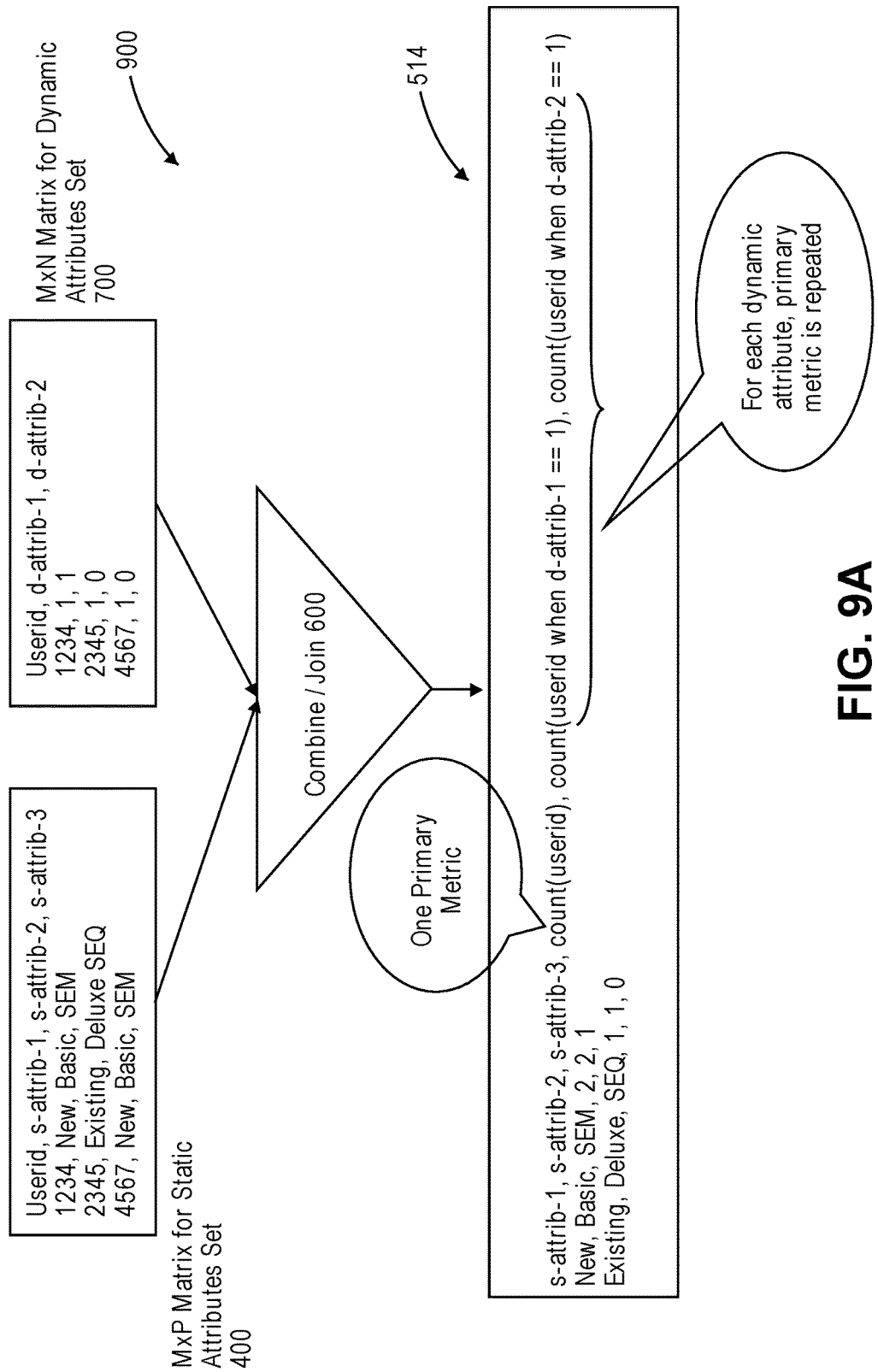

Continuing with reference to FIGS. 5-6, and with further reference to FIGS. 9A-B, at 512, the segmentation module 281, having determined the programmed attribute data 286 (FIG. 4B), received the previously determined supplemental attribute data 276 (FIG. 7B), stores programmed and/or supplemental attribute data as needed in the data store 250 and combines or joins 600 the programmed attribute data matrix 400 and the supplemental attribute data matrix 700. This is otherwise referred to as the "segmentation mix" 602 as shown in FIG. 6. In the example illustrated in FIGS. 6 and 9A-B, the supplemental attribute data 276 is added to the programmed attribute data 286 to form a new data structure 900 such as a M×(P+N) matrix, wherein M=number of website users 225, P=number of static, programmed attributes 282, and N=number of external, dynamic or supplemental attributes 272. FIGS. 9A-B also show how the programmed attribute data 286 in a first format (e.g., natural language format of an option or type of programmed attribute), whereas the supplemental attribute data 276 joined thereto or combined therewith is in a different data format, e.g., T/F format.

Figure 10:
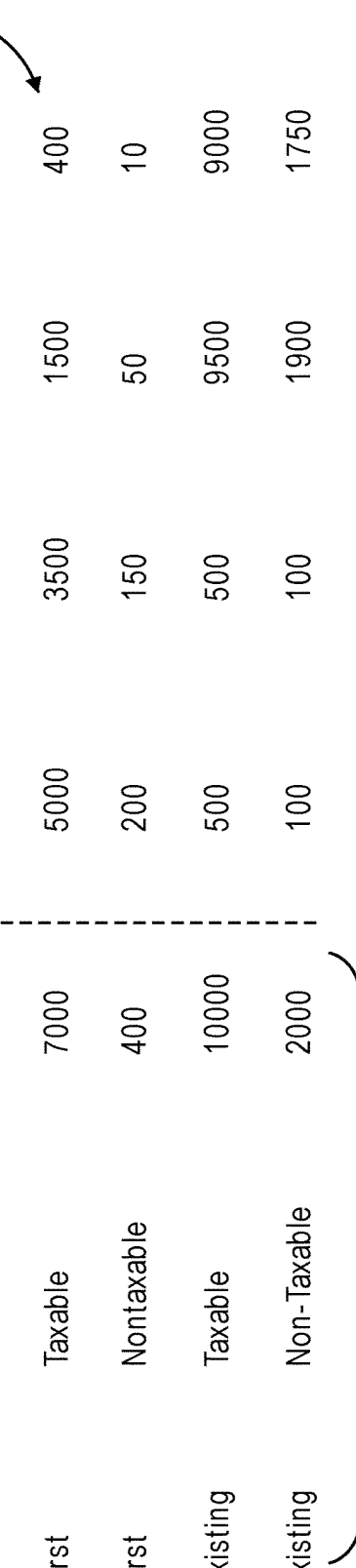
FIG. 10 illustrates an example segmentation data for different combinations of static, programmed attributes and a dynamic, supplemental attribute selected by an external source.

Continuing with reference to FIGS. 5-6 and 9A-B and with further reference to FIG. 10, at 514, the segmentation module 281 determines segmentation data 284 for different combinations of the static, programmed attributes 282/data 286, and the dynamic, supplemental attributes 272/data 276 by counting the number of "true" values for each programmed attribute/supplemental attribute combination, and generating a data structure 1000 for the segmentation results 284, e.g., in the form of a new matrix or by adding a new column associated with each of the supplemental attributes 272, or generating a resulting data structure may have (L+L×N) columns, where L=number of primary attributes and L×N is the number of supplemental attributes. Thus, all of the necessary metric aggregations over all of the combinations of the P static, programmed attributes 272 are performed, and for each of the N dynamic, supplemental attributes 282, the same metric is aggregated and stored in a new column in a single step by counting each "true" value as "1" for the dynamic, supplemental attribute 272, resulting in (L+L×N) metric columns.

For example, the segmentation module 281 may determine a number of website users 225 for the following combinations of programmed attributes 282/supplemental attributes 272 and respective data 286/276: 1. Number of website users 225 that are "New" users, live in a "Taxable" state, and that called the help desk; 2. Number of website users 225 that are "New" users, live in a "Taxable" state, and that only reviewed the tax preparation application website 211; 3. Number of website users 225 that are "New" users, live in a "Taxable" state, and that purchased or paid for the online tax preparation application 211; 4. Number of website users 225 that are "New" users, live in a "Taxable" state, and that used the tax preparation application 211 to prepare and electronically file an electronic tax return 212 with a tax authority 235, and so on.

As another example, the segmentation module 218 may determine a number of website users 225 for the following combinations or programmed attributes 282/supplemental attributes 272 and respective data 286/276: 1. Number of website users 225 that are "First" time users, live in a "NonTaxable" state, and that called the help desk; 2. Number of website users 225 that are "First" time users, live in a "Non Taxable" state, and that only reviewed the tax preparation application website 211; 3. Number of website users 225 that are "First" time users, live in a "Non Taxable" state, and that purchased or paid for the online tax preparation application 211; 4. Number of website users 225 that are "First" time users, live in a "Non Taxable" state, and that used the tax preparation application 211 to prepare and electronically file an electronic tax return 212 with a tax authority 235, and so on for other combinations.

It will be understood that while certain examples have been provided to show how segmentation analysis can be applied across different types of attribute data, and how resulting segmentation data 284 can be reflected in one or more data structures, other combinations may be utilized. Thus, while illustrative examples are described with reference to combinations of two programmed attributes 272 and one supplemental attribute 282, segmentation data determinations may involve a combination of one programmed attribute 282 and one supplemental attribute 272, multiple programmed attributes 282 and one supplemental attribute 272, one programmed attribute and multiple supplemental attributes 272, multiple programmed attributes 282 and multiple supplemental attributes 272, all programmed attributes 282 and one or more supplemental attributes 272, one or more programmed attributes 282 and all supplemental attributes 272, or all programmed attributes 282 and all supplemental attributes 272 and associated data 286/276 provided by the analyst 270.

For example, FIG. 10 illustrates segmentation results 284 involving two programmed attributes 272 and one supplemental attribute 282. In the illustrated example, of the 5,000 website users 225 that were new users and lived in a taxable state (programmed attributes), 2,500 of those website users 225 called the help line (supplemental attribute), whereas 3,000 of those "new/taxable" users (programmed attributes) purchased or paid for the tax preparation application 211 (supplemental attribute), and 2,400 of those "new/taxable" users (programmed attributes) eventually prepared an electronic tax return 212 and filed the electronic tax return with a tax authority 235 (supplemental attribute). As another example, of the 7,000 first time users that lived in a taxable state (programmed attributes), 5,000 called the help desk (supplemental attribute), whereas only 400 proceeded to prepare and electronically file a tax return 212 (supplemental attribute).

Figure 11A:
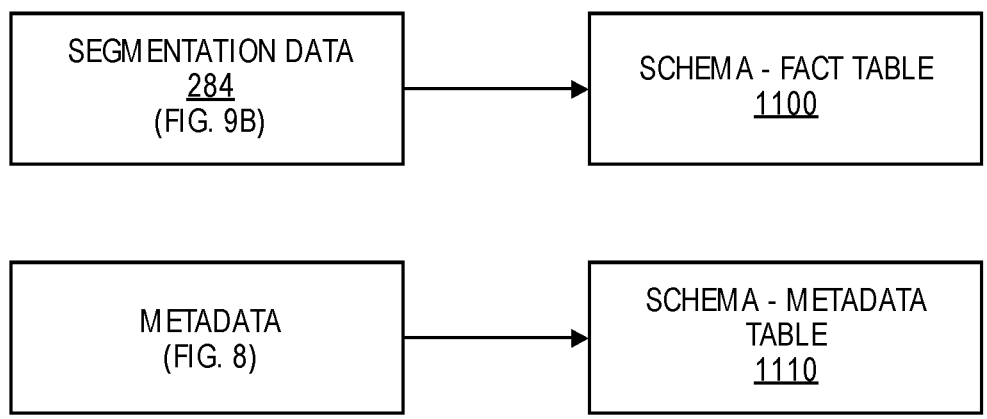

Referring again to FIG. 5 and with further reference to FIGS. 11A-B, at 516, the segmentation data 284 that was determined for each combination and stored to a data structure 1000, such as shown in FIG. 10, is loaded or incorporated into a different data structure suitable for an eventual query 271. According to one embodiment, the segmentation data 284 is loaded into a fact table 1100 of relational database management system (RDBMS) schema that will be used for eventual queries 271. For example, in a star schema, segmentation data is loaded into a fact table 1100, and programmed attributes are dimensions. FIG. 11B generally illustrates provides one example of how a fact table 1100 including segmentation data and that is ready for queries 271 may be configured and includes columns 1101a-f for column name, whether data is nullable, data type, data default, column identifier and any comments. FIG. 2 generally illustrates how such a fact table 1110 may be a component of or utilized by the database 260.

Figure 11C:
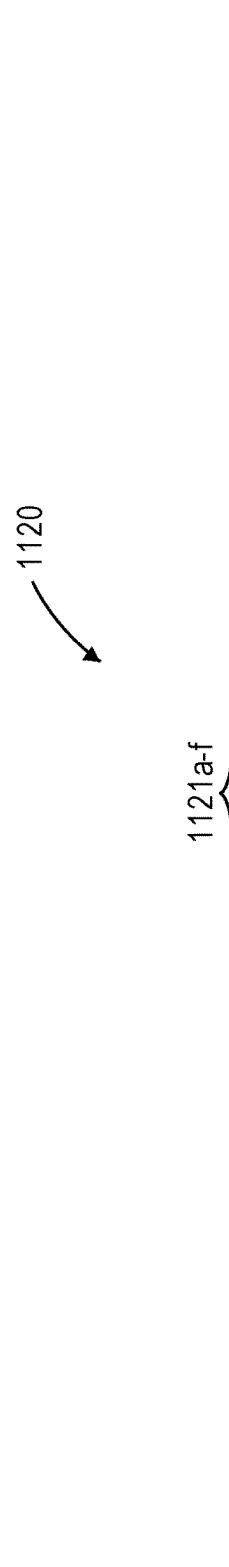
FIG. 11C illustrates an example of how a metadata table may be configured according to the schema and that is loaded with metadata.
Figure 12:
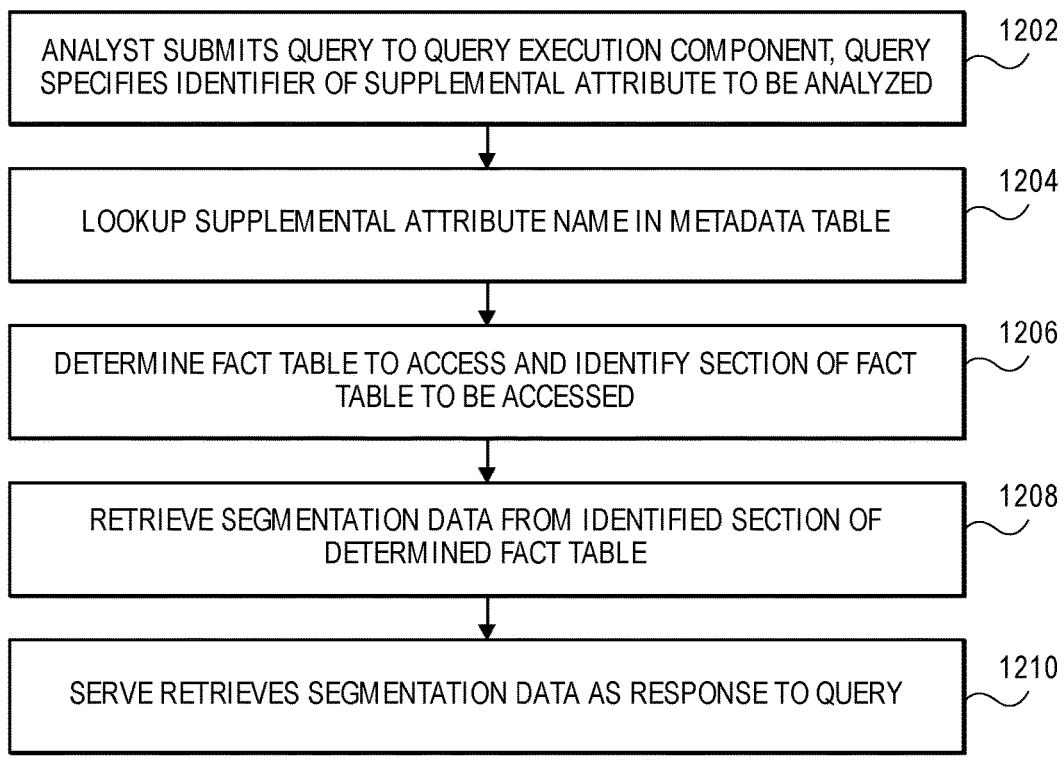
FIG. 12 illustrates a method according to one embodiment in which a query involving a dynamic, supplemental attribute received from an external source is processed.

Further, at 518, and with further reference to FIGS. 11A and 11C, metadata 279 that was previously received by the segmentation module 281 from the external source (e.g., as shown in FIG. 8) is also loaded into a data structure such as a metadata table 810 according to the schema. Thus, steps 516 and 518 involve loading the resulting segmentation data 284 and metadata 279 about supplemental attributes 272 received from the analyst 270 into respective data structures 1100, 1110 of the schema. FIG. 11C provides one example of how a table 1120 including metadata 279 and that is ready for queries 271 may be configured and includes columns 1121a-f for column name, whether data is nullable, data type, data default, column identifier and any comments. FIG. 2 generally illustrates how the metadata table 1120 may be a component or utilized by the database 260.

Figure 13:
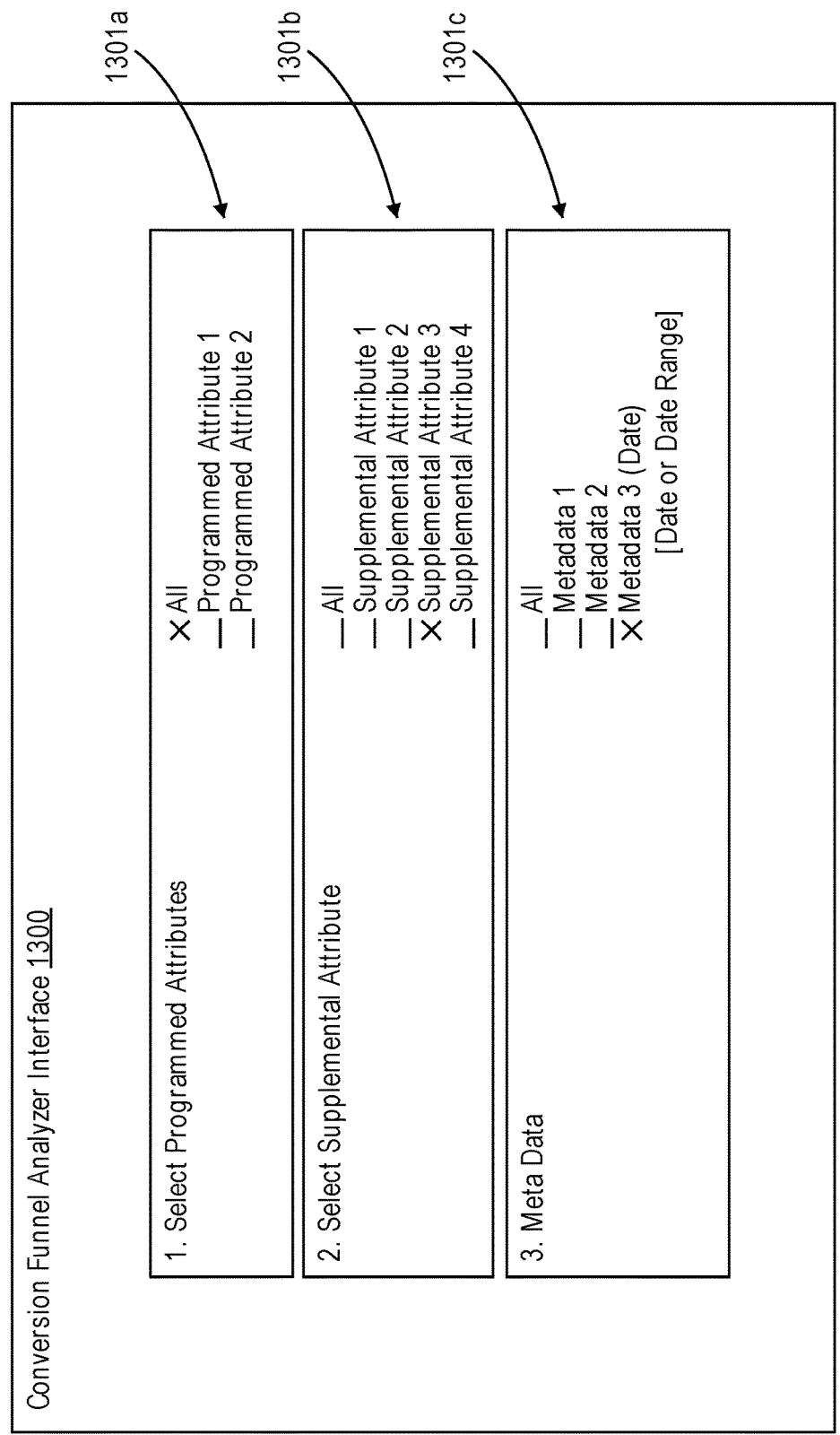
FIG. 13 generally illustrates an interface that may be generated according to embodiments and that allows an external source to select one or more static, programmed attributes, one or more dynamic, supplemental attributes, and metadata for segmenting users of a tax preparation application website.
Figure 14:
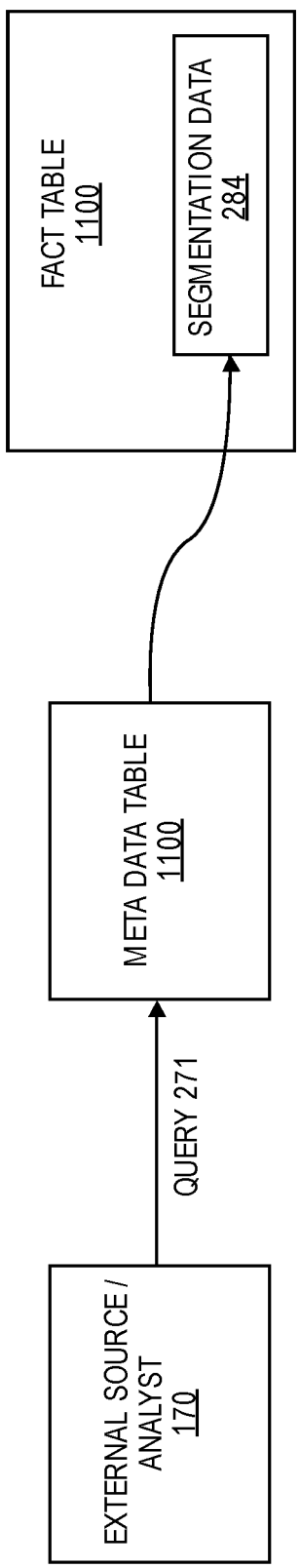
FIG. 14 illustrates a method according to one embodiment in which a query involving a dynamic, supplemental attribute received from an external source is processed by utilizing an intermediary metadata table to determine a location or field within a fact table that contains segmentation data that should be served as a response to the query.

Referring to FIGS. 13-14, having generated tables 1110, 1120 according to the schema, the tables 1110, 1120 are now ready to be utilized for processing queries 271 such as Structured Query Language (SQL) queries at the front-end of the system from analysts 270. At 1302, an analyst 270 submits a query 271 to a query execution component, which may be the database 260, or the CFA 280 or segmentation module 281 (as illustrated in FIG. 13) that communicates the query 271 to the database 260. For example, as shown in FIG. 13, the CFA 280 or segmentation module 281 may generate an interface 1300 that is displayed to the analyst and through which the analyst 270 can enter selections 1301a-c for one or more programmed attributes 282 (if all programmed attributes 282 are not to be analyzed) in combination with one or more supplemental attributes 272 that are to be analyzed. A query 271 may specify the type or name of the dynamic, supplemental attribute 282 to be analyzed, and may, as shown in FIG. 13, also specify one or more other query components such as associated metadata, e.g., time grain data, in the event that the analyst 270 is interested in segmentation data about the supplemental attribute 282 on a particular date or range of dates. At 1304, the query execution component accesses the metadata table 1120, looks up the name of the supplemental attribute 282 in the metadata table 1120, and at 1306, determines which fact table 1110 to access, e.g. by the cross-referenced name or other identifier of a fact table 1110, and the section or field of the fact table 1110 from which segmentation data should be read, e.g., by the cross referenced column identifier or other indicator. For example, the query 271 may look at the metadata table 1120 based on what is specified in the query 271, identify the fact table column prefix for the requested supplemental attribute 282, and pre-append the fact table column prefix with the name of the supplemental attribute 282 to form a complete field name of the supplemental attribute field in the fact table 1110.

At 1308, the query 271 to obtain the segmentation data 284 for the particular supplemental attribute 282 is prepared and executed, and at 1308, the segmentation data 282 from the section or field of determined fact table 1110 identified using the metadata table 1120 is retrieved, and at 1310, the segmentation data result is served to the analyst 270 in response to the query 271. All necessary bit map indices may be created on the P programmed attributes 272 for performance.

Thus, the analysts 270 can provide dynamic or supplemental attributes 282 and data 286 thereof to the segmentation module 281 based on individual analyst needs, or to analyze particular website users 225 or groups of website users 225, while being able to process data of different attributes in different formats, and transforming segmentation data 284 and metadata 279 into a schema for query 271 execution.

Figure 15:
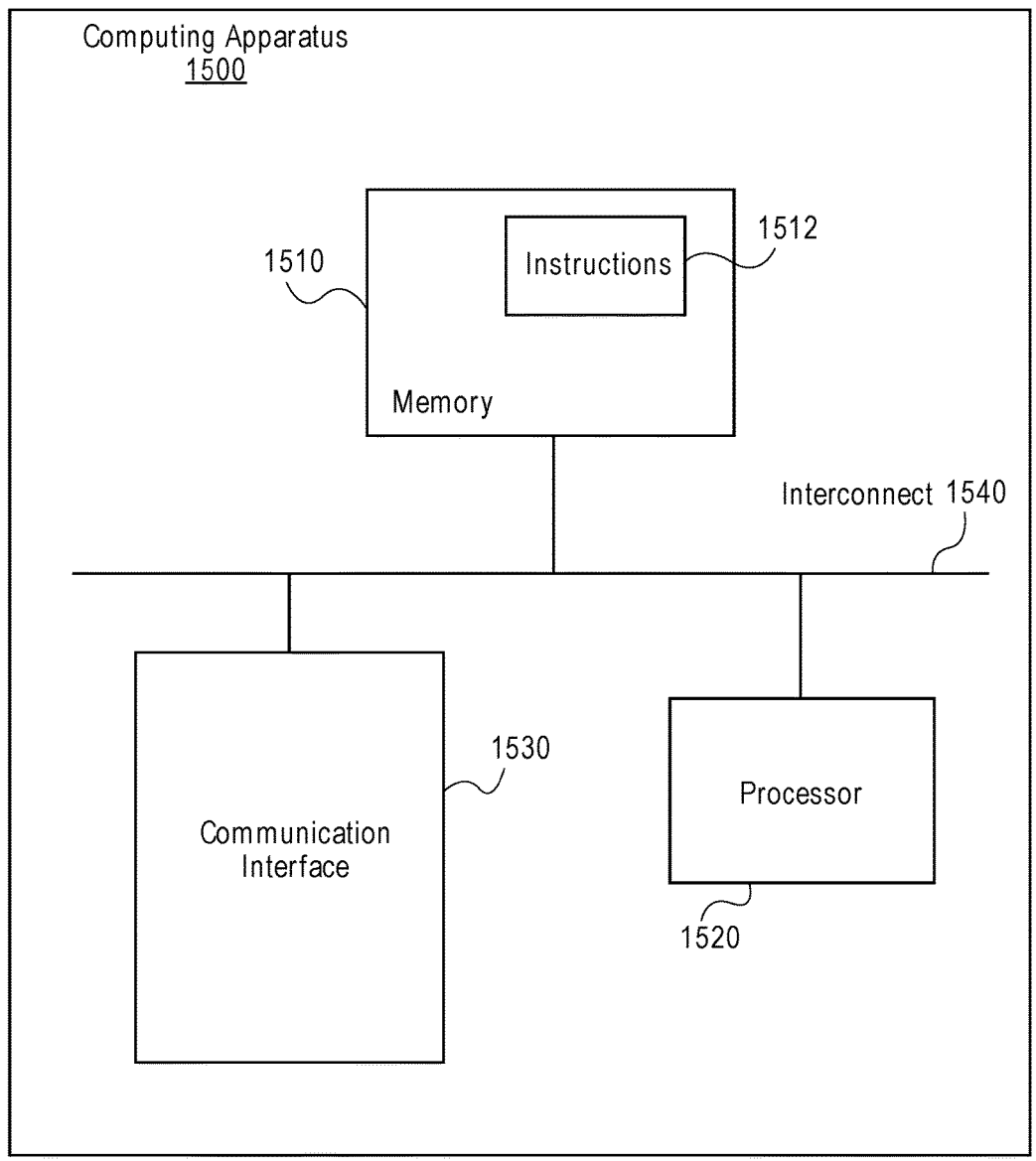
FIG. 15 is a block diagram of components of a computing apparatus or system in which various embodiments may be implemented or that may be utilized to execute various embodiments.

FIG. 15 generally illustrates components of a computing device 1500 that may be utilized to execute embodiments and that includes a memory 1510, account processing program instructions 1512, a processor or controller 1520 to execute account processing program instructions 1512, a network or communications interface 1530, e.g., for communications with a network or interconnect 1340 between such components. The memory 1510 may be or include one or more of cache, RAM, ROM, SRAM, DRAM, RDRAM, EEPROM and other types of volatile or non-volatile memory capable of storing data. The processor unit 1520 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1540 may include a system bus, LDT, PCI, ISA, or other types of buses, and the communications or network interface may, for example, be an Ethernet interface, a Frame Relay interface, or other interface. The network interface 1530 may be configured to enable a system component to communicate with other system components across a network which may be a wireless or various other networks. It should be noted that one or more components of computing device 1500 may be located remotely and accessed via a network. Accordingly, the system configuration provided in FIG. 15 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1520 performs steps or executes program instructions 1512 within memory 1510 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while embodiments have been described with reference to examples involving certain numbers of website users, it will be understood that the population to be segmented may involve tends, hundreds, thousands and millions of website users. Similarly, it will be understood that embodiments may involve different numbers of programmed attributes and supplemental attributes and combinations thereof. Moreover, it will be understood that an attribute may be a programmed attribute or a supplemental attribute depending on the circumstances. For example, during a first tax year or first version of a CFA for analyzing users of a tax preparation application website, a certain attribute (such as "did user call help line") are programmed into the CFA. During a second, later tax year for another version of the CFA, the "did user call help line" attribute is not programmed into the CFA, and an analyst or product manager may determine data about that now supplemental "did user call help line" attribute and provide it to the CFA for processing according to embodiments with the attributes that are internally programmed.

Further, while certain embodiments are described with reference to a population of users of a tax preparation application website, other embodiments may involve other types of websites.

Further, while examples of embodiments are provided in which data structures that are generated or received from the external source are in the form of matrices, it will be understood that other data structures may also be utilized.

While multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially.

Accordingly, embodiments are intended to exemplify alternatives, modifications, and equivalents that may fall within the scope of the claims.

What is claimed is:

1. A computer-implemented method, comprising:

receiving or determining, by a segmentation module in communication with an online tax preparation application website and executed by a processor of a computer, respective navigation data generated based on respective end users interacting with the online tax preparation application website through respective computers executing respective browsers and preparing respective electronic tax returns of respective taxpayers, the segmentation module being programmed with static attributes comprising respective static attribute options in a natural language format at a time of release of the online tax preparation application;

after release of the online tax preparation application and generation of the navigation data, determining, by the segmentation module, first numerical segmentation data of respective static attributes options for respective end users;

after release of the online tax preparation application, generation of the navigation data and determination of the first numerical segmentation data, receiving, by the segmentation module and from an external source that is not an end user for which navigation data was previously generated, respective supplemental attributes comprising supplemental attribute options in a binary or ternary format that were not previously programmed into the segmentation module;

determining, by the segmentation module, second numerical segmentation data of respective supplemental attribute options for respective end users;

generating, by the segmentation module, a first data structure aggregating respective numerical segmentation data based on respective static attribute options and supplemental attribute options;

generating, by the computer, a second data structure for a schema of a database management system and incorporating numerical segmentation data of the first data structure into the second data structure;

after the generation of the first data structure and the second data structure, receiving, by the computer, a query from a computing device of a query source that is not an end user of the online tax preparation application website for which navigation data was previously received or determined, the query comprising criteria specifying at least one, static attribute option and at least one supplemental attribute option;

the computer executing the query against the second data structure such that the query is executed against aggregated data and generating a result comprising numerical segmentation data indicating a number of the end users of the online tax preparation application website satisfying the query criteria; and the computer presenting the result of query execution to the query source through a display of the computing device.

2. The method of claim 1, wherein the query source is the external source that provided the supplemental attributes.

3. The method of claim 1 being performed by a segmentation module of a conversion funnel analyzer executed by the computer.

4. The method of claim 1, the query criteria specifying a plurality of static attribute options and at least one supplemental attribute option.

5. The method of claim 1, the static attribute options in the natural language format comprising categorical data.

6. The method of claim 1, the respective static attributes comprising topics associated with preparing an electronic tax return or the online tax preparation application, each topic having a plurality of topic options, wherein respective data of respective static attributes comprises respective topic options for respective end users.

7. The method of claim 1, the supplemental attribute options indicating whether or not an end user satisfied respective topics associated with preparing an electronic tax return or the online tax preparation application.

8. The method of claim 1, the binary or ternary format comprising a true/false format or a 1/0 format.

9. The method of claim 1, the navigation data comprising data entered by an end user into a form or field generated by the online tax preparation application website during end user interaction with the online tax preparation application website.

10. The method of claim 1, the navigation data comprising clickstream data generated in response to an end user interacting with the online tax preparation application website.

11. The method of claim 1, wherein a supplemental attribute of at least one end user is based at least in part upon data of an electronic tax return of the at least one end user.

12. The method of claim 1 being performed by a segmentation module of a conversion funnel analyzer executed by the computer, the computer receiving the supplemental attributes of after respective static attributes of respective users have been programmed into the conversion funnel analyzer.

13. The method of claim 1, the schema comprising a relational database management system schema.

14. The method of claim 13, wherein a fact table of the schema is populated with aggregated first numerical segmentation data and second numerical segmentation data, and each static attribute is a dimension table referenced by the fact table.

15. The method of claim 14, further comprising the computer receiving metadata of the supplemental attributes, wherein a metadata table of the schema is populated with the supplemental attribute metadata.

16. The method of claim 15, wherein the query is executed utilizing both the metadata table and the fact table.

17. The method of claim 15, the metadata table comprising time grain data, fact table name data and dynamic attribute name data.

18. The method of claim 15, the query received from the query source comprising a selected supplemental attribute option to be analyzed and a selected date, further comprising the computer accessing the metadata table, determining a name of the fact table and a section or location of the fact table associated with the selected supplemental attribute and the selected date within the metadata table, and accessing the determined section or location of the fact table, wherein segmentation data at the determined section or location is served as the result in response to the query.

19. The method of claim 1, after execution of the first query, further comprising the computer:
- receiving, from the same or other external source that is not an end user of the online tax preparation application website for which navigation data was previously received or determined, other supplemental attributes comprising supplemental attribute options in a binary or ternary format;
- receiving a second query from the computing device of the query source, the second query comprising second criteria specifying at least one static attribute option, and at the at least one other supplemental attribute option; and
- the computer executing the second query and generating a second result comprising second numerical segmentation data indicating a second number of the end users of the online tax preparation application website satisfying the second query criteria.

* * * * *